(No Model.) 2 Sheets—Sheet 1.

G. F. SIMONDS.
BALL BEARING.

No. 434,479. Patented Aug. 19, 1890.

Witnesses:
J. A. Rutherford
Geo. W. Rea

Inventor:
George F. Simonds
By James L. Norris
Attorney (No Model.) 2 Sheets—Sheet 2.

G. F. SIMONDS.
BALL BEARING.

No. 434,479. Patented Aug. 19, 1890.

UNITED STATES PATENT OFFICE.

GEORGE FREDERICK SIMONDS, OF FITCHBURG, MASSACHUSETTS.

BALL-BEARING.

SPECIFICATION forming part of Letters Patent No. 434,479, dated August 19, 1890.

Application filed January 11, 1890. Serial No. 336,701. (No model.)

*To all whom it may concern:*

Be it known that I, GEORGE FREDERICK SIMONDS, engineer, a citizen of the United States, and a resident of Fitchburg, Massachusetts, have invented certain new and useful Improvements in Ball-Bearings, of which the following is a specification, reference being had to the accompanying drawings.

My invention relates to axle and other bearings in which spherical rollers or balls are employed to diminish the friction.

An important feature of my said invention is the construction of the bearing with the balls arranged in circular series or groups of different diameter and in different planes between concentric and plane surfaces formed on inner and outer rings or annular or tubular pieces. I arrange the balls of the series of larger diameter to bear against and roll upon plane bearing-surfaces and the balls of the series of smaller diameter to bear against and roll upon concentric bearing-surfaces on the said rings or annular or tubular pieces, or vice versa. I prefer to combine a tubular piece or sleeve having suitable concentric and plane surfaces with two correspondingly-shaped rings or annular pieces. In some instances I provide the said tubular piece or sleeve with an external rib or collar, on which are formed the plane and one of the concentric surfaces, and arrange it within rings or annular pieces having corresponding internal ribs or flanges. In other instances I make the said tubular piece with an internal circumferential projection or rib, on which are formed the plane and one of the concentric surfaces, and I arrange two rings or annular pieces having corresponding external ribs or flanges within the said tubular piece. My improved bearing can, however, be provided with any other suitable number of rings or annular or tubular pieces.

In the accompanying drawings I have shown how my said invention may be conveniently and advantageously carried into practice.

Figure 1:
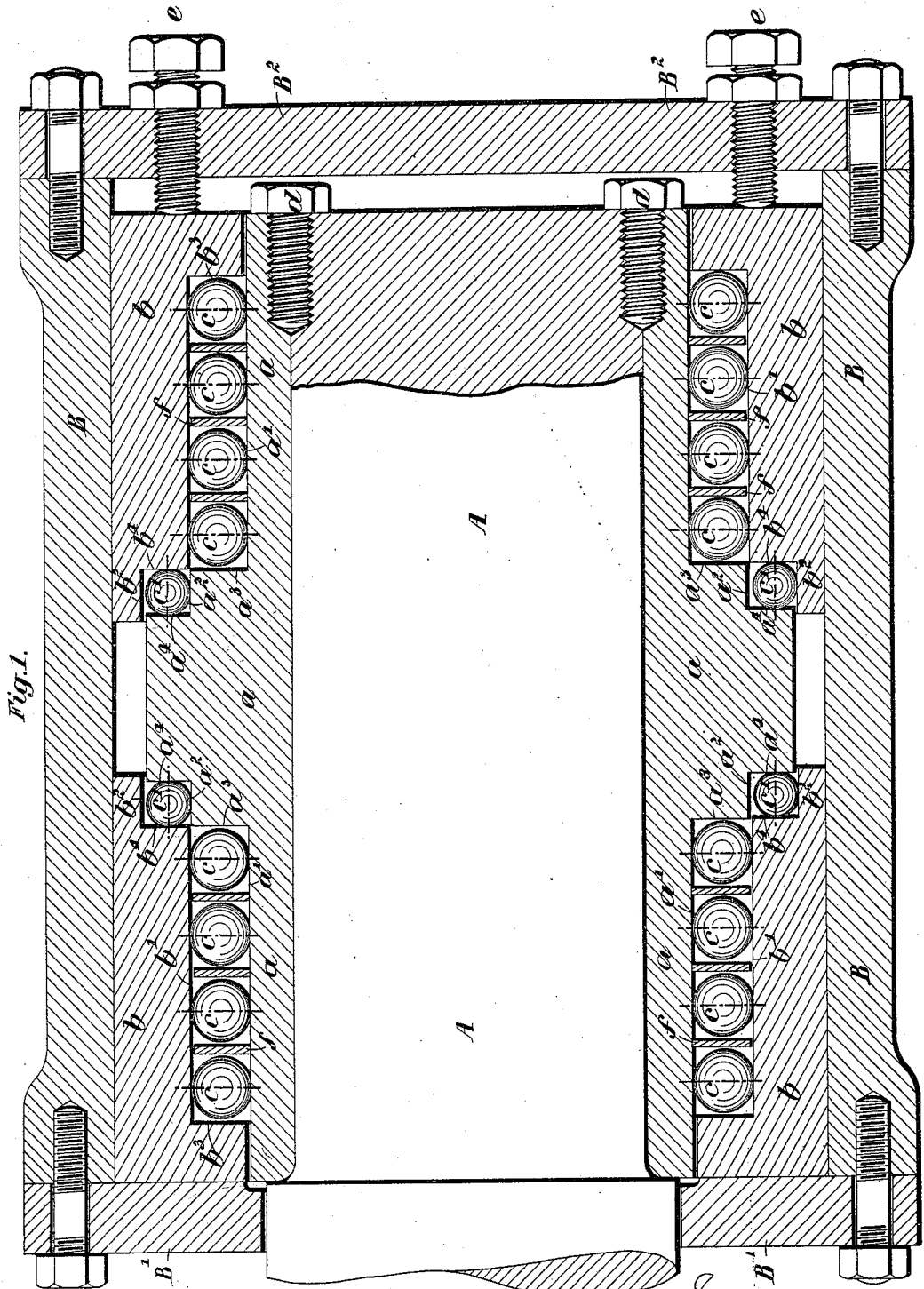
Figure 2:
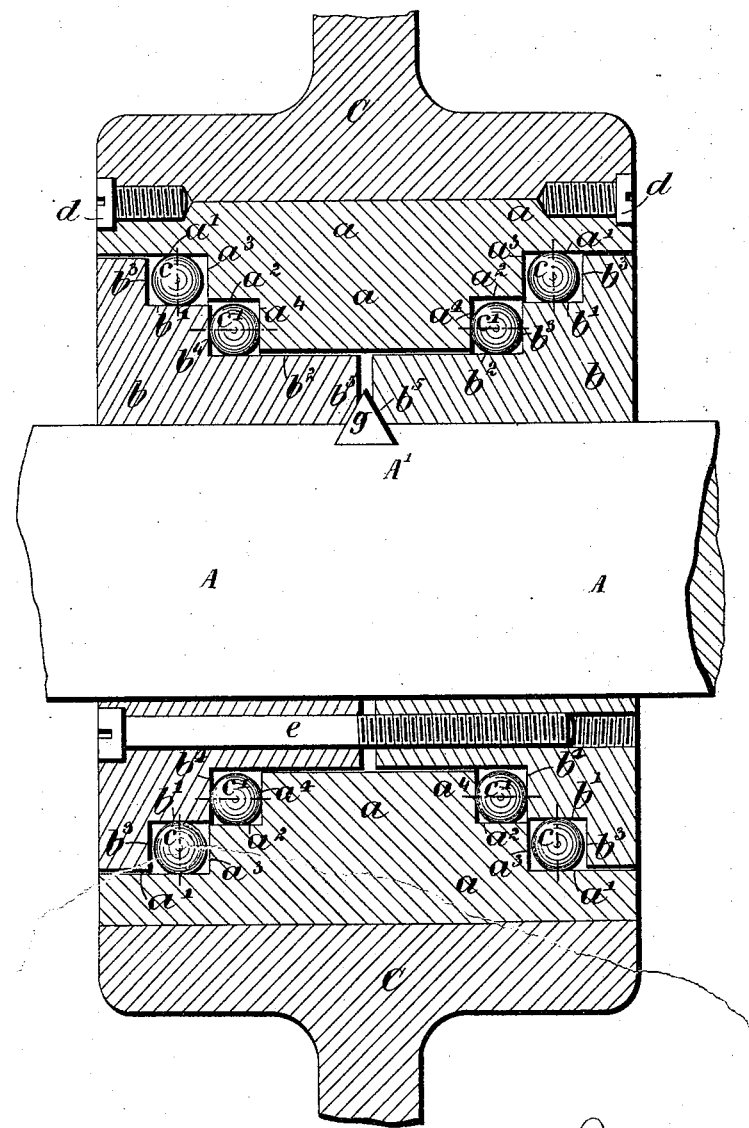

Figure 1 is a longitudinal central section of a bearing constructed according to my present invention for a car-axle or the like. Fig. 2 is a vertical central section of a bearing constructed according to my said invention for a loose pulley or other rotating piece of machinery.

A is the shaft or axle.

$a$ is a tubular piece or sleeve, which has a surface $a'$ concentric with the shaft or axle and which is provided with a circumferential projection, rib, or collar having a surface $a^2$ concentric with the said shaft or axle, and two plane surfaces $a^3$ $a^4$ parallel to each other and perpendicular to the said concentric surfaces.

$b\ b$ are two rings or annular pieces, each having surfaces $b'\ b^2$ concentric with the said surfaces $a'\ a^2$, and plane surfaces $b^3\ b^4$ parallel to the said plane surfaces $a^3\ a^4$. These concentric and plane surfaces form circular channels or cavities of different diameters, in which are arranged in circular series or groups the balls $c\ c'$. The balls $c$ bear against and roll upon the concentric surfaces $a'\ b'$ and serve to support the shaft or axle, or the part in which the said shaft or axle rotates, or which rotates thereon. The balls $c'$ are arranged between the concentric and plane surfaces $a^2\ a^4$ on the said tubular piece $a$, and the concentric and plane surfaces $b^2\ b^4$ on each ring $b$, and these balls bear against and roll upon the said plane surfaces $a^4\ b^4$ and serve to resist thrust or endwise motion of the parts relatively to each other.

In the bearing shown in Fig. 1 the tubular piece or sleeve $a$ is secured upon the axle A by means of screws $d$, and the rings or annular pieces $b$ are fitted in a box or casing B, closed at its ends by covers B' B². Screws $e$ are passed through tapped holes in the cover B² for the purpose of adjusting the rings $b$ at one end of the box or casing relatively to the rib or collar of the tubular piece $a$, the screws $e$ first moving inward and adjusting the adjacent ring until the balls of the corresponding series or group are brought to a bearing, and then drawing the box or casing B toward them until the balls of the series or group at the other end of the said box or casing are brought to a bearing. There are four circular series or groups of balls $c$ arranged between the concentric and plane surfaces $a'$ $a^3$ on the said tubular piece or sleeve $a$ and the concentric and plane surfaces $b'\ b^3$ on each ring $b$. Suitable rings $f$ are arranged between these series or groups of balls to separate the balls of one series from those of another series.

In the bearing shown in Fig. 2 the tubular piece $a$ is secured by means of screws $d$ in the nave or hub C of a pulley or similar rotating piece of machinery.

The rings $b$ are fixed upon the shaft A as follows—viz: a transverse slot or groove A' is formed in the shaft A, and in this slot or groove is fitted a metal bar or key $g$, preferably of triangular form in transverse section. This key projects above the shaft and engages in recesses or notches $b^5$ in the rings $b$, so that by turning the adjusting-screws $e$, which are passed through one ring $b$ and screwed into the other ring $b$, the said rings may be drawn together upon the key, and will thus be securely held in place upon the shaft.

It is obvious that various kinds of bearings can be constructed with balls arranged in circular series or groups, which are of different diameters and are situated in different planes, as hereinbefore described.

Certain features of construction shown and described, but not claimed in this application, are shown, described, and claimed in applications filed by me, Serial Nos. 331,639, 336,403, and 336,700.

What I claim is—

1. A ball-bearing wherein the balls are arranged in circular series or groups of different diameters and in different planes between concentric and plane surfaces formed on inner and outer rings or annular or tubular pieces, for the purposes above specified.

2. In a ball-bearing, the combination of inner and outer rings or annular or tubular pieces having concentric and plane surfaces which, when the said rings or annular or tubular pieces are placed in their proper relative positions, form annular channels or cavities of different diameters and in different planes, and balls arranged in circular series or groups in the said channels or cavities, substantially as and for the purposes above specified.

3. In a ball-bearing, the combination of a ring or annular or tubular piece $a$, having concentric surfaces $a'$ $a^2$ and plane surfaces $a^3$ $a^4$, rings or annular pieces $b$, having concentric surfaces $b'$ $b^2$ and plane surfaces $b^3$ $b^4$, and balls $c$ $c'$, arranged in annular channels or cavities of different diameters formed by the said concentric and plane surfaces, substantially as and for the purposes set forth.

4. In a ball-bearing, the combination of a ring or annular or tubular piece $a$, having concentric surfaces $a'$ $a^2$ and plane surfaces $a^3$ $a^4$, a ring or annular piece $b$, having concentric surfaces $b'$ $b^2$ and plane surfaces $b^3$ $b^4$, and balls $c$ $c'$, arranged in annular channels or cavities of different diameters formed by the said concentric and plane surfaces, one of the said rings or annular pieces being adjustable relatively to the other, substantially as and for the purposes set forth.

5. In a ball-bearing, the combination of a ring or annular or tubular piece $a$, having concentric surfaces $a'$ $a^2$ and plane surfaces $a^3$ $a^4$, rings or annular pieces $b$, having concentric surfaces $b'$ $b^2$ and plane surfaces $b^3$ $b^4$, balls $c$ $c'$, arranged in annular channels or cavities of different diameters formed by the said concentric and plane surfaces, and screws $e$ for adjusting the said rings or annular pieces $b$ relatively to the ring or annular piece $a$, substantially as and for the purposes set forth.

6. In a ball-bearing, the combination of a ring or annular or tubular piece $a$, having concentric surfaces $a'$ $a^2$ and plane surfaces $a^3$ $a^4$, rings or annular pieces $b$, having concentric surfaces $b'$ $b^2$ and plane surfaces $b^3$ $b^4$, which, together with the concentric and plane surfaces of the ring or tube $a$, form annular channels or cavities of different diameters, a circular series or group of balls $c'$, arranged in one of the said channels or cavities and bearing against the plane surfaces thereof, circular series or groups of balls $c$, arranged in the other channel or cavity, and rings $f$, arranged between these series or groups of balls, substantially as and for the purposes set forth.

7. In a ball-bearing, the combination of a ring or annular or tubular piece $a$, having concentric surfaces $a'$ $a^2$ and plane surfaces $a^3$ $a^4$, rings or annular pieces $b$, having concentric surfaces $b'$ $b^2$ and plane surfaces $b^3$ $b^4$, which, together with the concentric and plane surfaces on the ring or tube $a$, form annular channels or cavities, balls $c$ $c'$, arranged in the said channels or cavities, and screws $e$ for adjusting the said rings $b$ relatively to the ring or tube $a$, substantially as and for the purposes set forth.

8. In a ball-bearing, the combination of a ring or annular or tubular piece $a$, having concentric surfaces $a'$ $a^2$ and plane surfaces $a^3$ $a^4$, rings or annular pieces $b$, having concentric surfaces $b'$ $b^2$ and plane surfaces $b^3$ $b^4$, which, together with the concentric and plane surfaces on the ring or tube $a$, form annular channels or cavities, balls $c$ $c'$, arranged in the said channels or cavities, a key $g$, fitted in a transverse slot or groove in the shaft A and engaging in notches or recesses $b^5$ in the ring $b$, and screws $e$, passed through one of the said rings $b$ and screwed into the other of the said rings, all substantially as and for the purposes set forth.

In testimony whereof I have hereunto signed my name in the presence of two subscribing witnesses.

GEORGE FREDERICK SIMONDS.

Witnesses:
DAVID YOUNG,
CHAS. B. BURDON.